(12) United States Patent
Bartlett

(10) Patent No.: US 6,262,504 B1
(45) Date of Patent: Jul. 17, 2001

(54) HVAC MOTOR AND COVER STRUCTURE

(75) Inventor: Eric Bartlett, London (CA)

(73) Assignee: Siemens Canada Limited, Mississauga (CA)

( * ) Notice: Subject to any disclaimer, the term of this patent is extended or adjusted under 35 U.S.C. 154(b) by 0 days.

(21) Appl. No.: 09/495,593

(22) Filed: Feb. 1, 2000

Related U.S. Application Data
(60) Provisional application No. 60/119,541, filed on Feb. 10, 1999.

(51) Int. Cl.[7] ............................. H02K 5/00; H02K 5/20; H02K 9/19
(52) U.S. Cl. ................................. 310/89; 310/58
(58) Field of Search ..................... 310/52, 58, 60 R, 310/60 A, 89, 91; 29/596–598; 417/363, 364; 5/600, 610, 617

(56) References Cited

U.S. PATENT DOCUMENTS

| | | | |
|---|---|---|---|
| 3,143,284 | 8/1964 | Lindsjo et al. | 230/235 |
| 3,584,469 | 6/1971 | Butts | 62/295 |
| 4,025,960 | * 5/1977 | Gray et al. | 310/168 |
| 4,682,065 | 7/1987 | English et al. | 310/90 |
| 4,685,513 | 8/1987 | Longhouse et al. | 165/121 |
| 4,742,257 | * 5/1988 | Carpenter | 310/62 |
| 4,823,032 | 4/1989 | Ward et al. | 310/43 |
| 4,836,148 | 6/1989 | Savage et al. | 123/41.49 |
| 5,375,651 | * 12/1994 | Colwell | 165/47 |
| 5,530,304 | 6/1996 | Mirumachi et al. | 310/51 |
| 5,616,973 | * 4/1997 | Khazanov et al. | 310/54 |
| 5,747,903 | 5/1998 | Klingler | 310/75 |
| 5,767,596 | * 6/1998 | Stark et al. | 310/89 |
| 5,770,907 | 6/1998 | Danish et al. | 310/90 |
| 5,786,647 | * 7/1998 | Vollmer et al. | 310/89 |
| 5,861,689 | 1/1999 | Snider et al. | 310/71 |
| 5,861,691 | 1/1999 | Soh et al. | 310/89 |
| 5,883,451 | 3/1999 | Majchrzak et al. | 310/89 |
| 5,914,550 | * 6/1999 | Periyathamby et al. | 310/91 |

FOREIGN PATENT DOCUMENTS

| | | |
|---|---|---|
| 0805276A2 | 11/1997 | (EP) . |
| 0848477A1 | 12/1997 | (EP) . |
| 2 412 976 | 7/1979 | (FR) . |
| 2 606 562 | 5/1988 | (FR) . |

\* cited by examiner

*Primary Examiner*—Tran Nguyen

(57) ABSTRACT

An HVAC motor assembly for mounting to a housing includes a motor having a generally cylindrical portion and a connector extending from the cylindrical portion. The motor also has air flow passages therethrough. The assembly includes a one-piece cover structure including a generally cylindrical section having an opening at one end thereof and a closed end opposite the one end, and an interior between the ends. The motor is disposed in the interior so that one end of the motor is covered by the closed end. A flange structure extends from the cylindrical section. A first passage in the cover structure is in open communication with atmosphere and in communication with the interior. The first passage communicates with a connector opening in the cover structure. The first passage is sized to permit the connector of the motor to pass therethrough and the connector opening receives the connector. The connector opening is sized to fit tightly with the connector to substantially prevent air from passing between the connector and the cover structure. A second passage of the cover structure is in open communication with the interior and is in communication with the air flow passages of the motor so that air may enter the second passage and exit through the air flow passages to cool the motor. A vibration damping member is provided between the cylindrical portion of the motor and the cylindrical section of the cover structure to dampen vibration of the motor.

20 Claims, 5 Drawing Sheets

HVAC MOTOR AND COVER STRUCTURE

This application is based on U.S. Provisional Application No. 60/119,541, filed Feb. 10, 1999, and claims the benefit thereof for priority purposes.

FIELD OF THE INVENTION

This invention relates to Heating, Ventilation and Air Conditioning (HVAC) motor for an automotive HVAC system and more particularly to an HVAC motor cover structure used to mount the motor to a housing and to cover an exposed portion of the motor to reduce motor noise.

BACKGROUND OF THE INVENTION

A typical HVAC motor assembly is supported in a scroll which has an air inlet and an air discharge such that a portion of air flow moved by a blower wheel driven by the motor is diverted to a tube or channel to cool the motor. FIG. 1 shows, in an unassembled condition, a conventional HVAC motor assembly 10 for use in driving a blower wheel to force air to flow through an automotive HVAC system. The assembly 10 requires several parts to attach the motor 12 to a housing (not shown) and then cover the exposed portion of the motor 12 to help reduce motor noise. The motor 12 includes a steel flange 3 and a hush cover and motor cooling channel, indicated by numeral 2, covers the exposed portion of the motor 12. A clip 1 is provided to support a wiring harness of the motor 12. An additional plastic part defining a flange airflow spacer 5 is attached on the drive side of the motor to optimize the shape of the flange 3 to improve airflow in the system. To reduce air leakage, noise and vibration, gasket material 6 is provided on the flange 3 and a gasket 4 is provided between the motor 12 and hush cover 2.

Although the motor assembly 10 is effective in operation, the cost of the assembly can be reduced by reducing the number of components. Accordingly, there is a need to provide an improved HVAC motor cover structure to cover an HVAC motor which has fewer components than the conventional cover assembly yet is effective in reducing vibration and thus the overall noise.

SUMMARY OF THE INVENTION

An object of the present invention is to fulfill the need referred to above. In accordance with the principles of the present invention, this objective is obtained by providing an HVAC motor assembly for mounting to a housing. The motor assembly includes a motor having a generally cylindrical portion and a connector extending from the cylindrical portion. The motor also has an air flow passage therethrough. The assembly includes a one-piece cover structure including a generally cylindrical section having an opening at one end thereof and a closed end opposite the one end, and an interior between the ends. The motor is disposed in the interior so that one end of the motor is covered by the closed end. A flange structure extends from the cylindrical section. A first passage in the cover structure is in open communication with atmosphere and in communication with the interior. The first passage communicates with a connector opening in the cover structure. The first passage is sized to permit the connector of the motor to pass therethrough and the connector opening receives the connector. The connector opening is sized to fit tightly with the connector to substantially prevent air from passing between the connector and the cover structure. A second passage of the cover structure is in open communication with the interior and in communication with the air flow passage of the motor so that air may enter the second passage and exit through the air flow passages to cool the motor. A vibration damping member is provided between the cylindrical portion of the motor and the cylindrical section of the cover structure so as to contact the cylindrical portion and the cylindrical section to dampen vibration of the motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
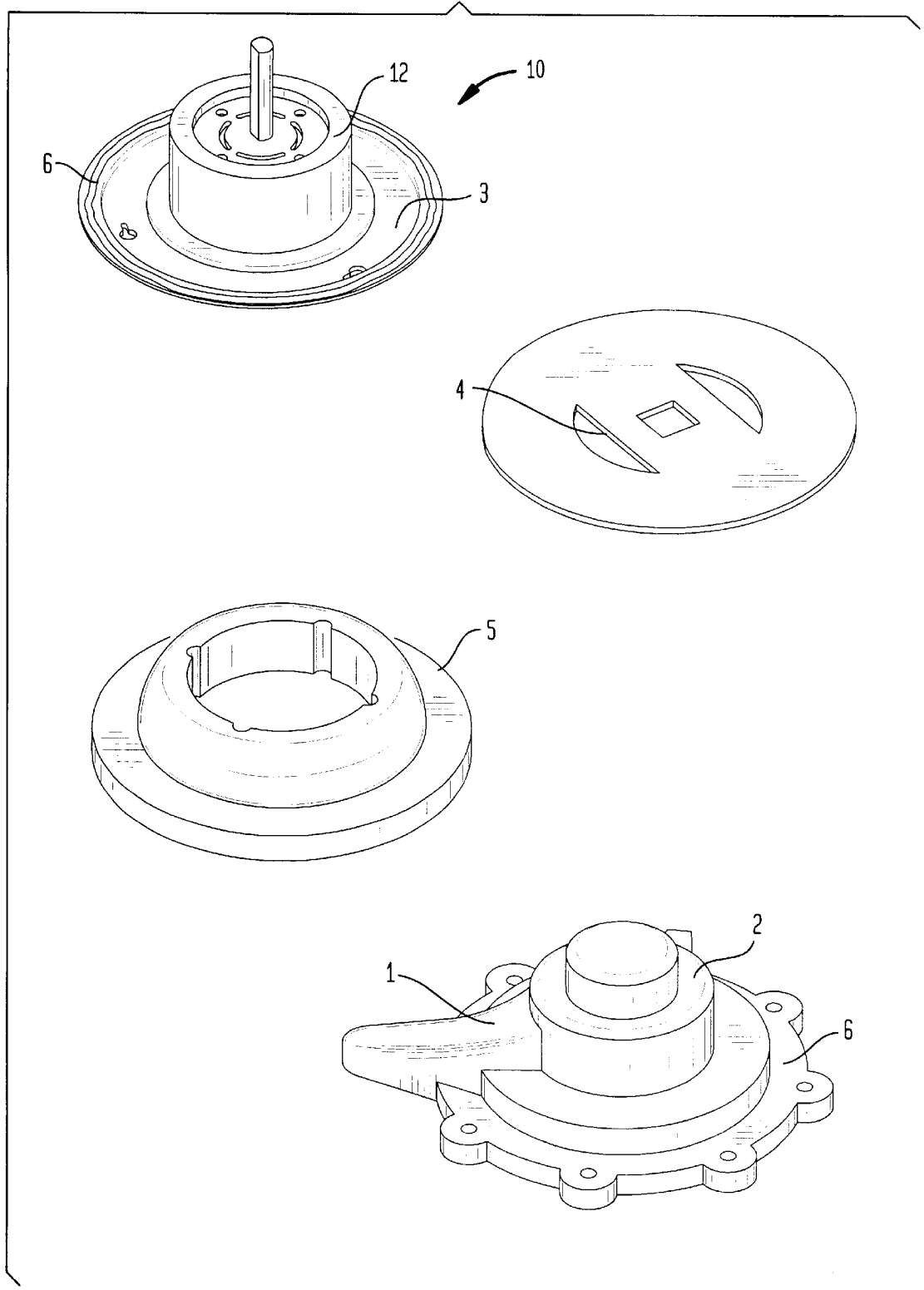
FIG. 1 is a view of components of a conventional HVAC motor assembly shown in an unassembled condition.
Figure 2:
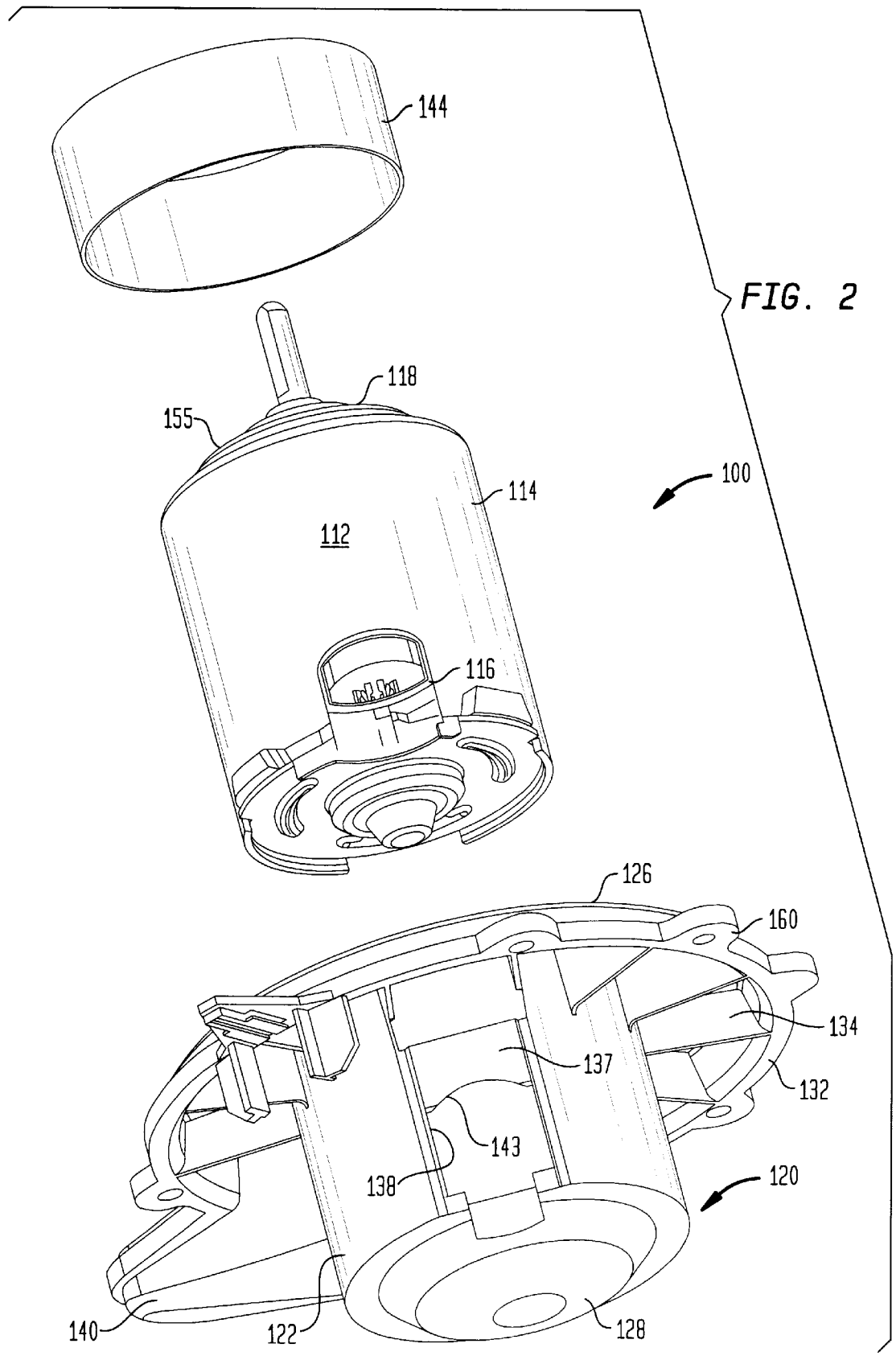
FIG. 2 is an exploded view of a motor and cover structure provided in accordance with the principles of the present invention.

Referring to FIG. 2, an HVAC motor assembly, provided in accordance with the principles of the present invention, is shown generally indicated at 100. The motor assembly 100 comprises a motor 112 having a generally cylindrical portion 114 and an electrical connector 116 for powering the motor extending from the cylindrical portion 114. The motor 112 has one or more internal air flow passages 118 which communicate with atmosphere at end 155 of the motor. The passages 118 are used to cool the motor, as will be explained more fully below.

Figure 3:
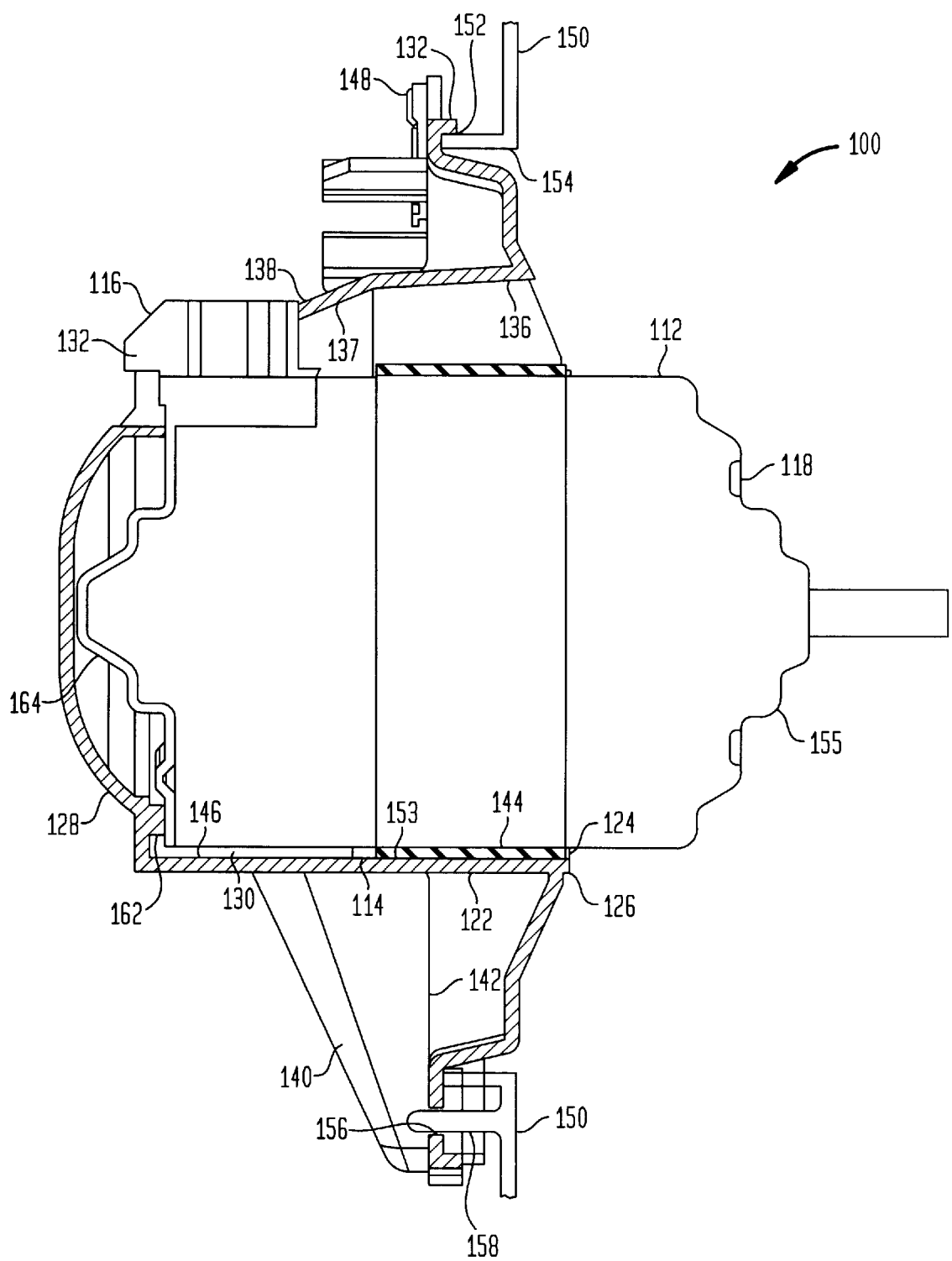
FIG. 3 is a side view, partially in section, of the motor and cover structure of FIG. 2 shown in an assembled condition.
Figure 4:
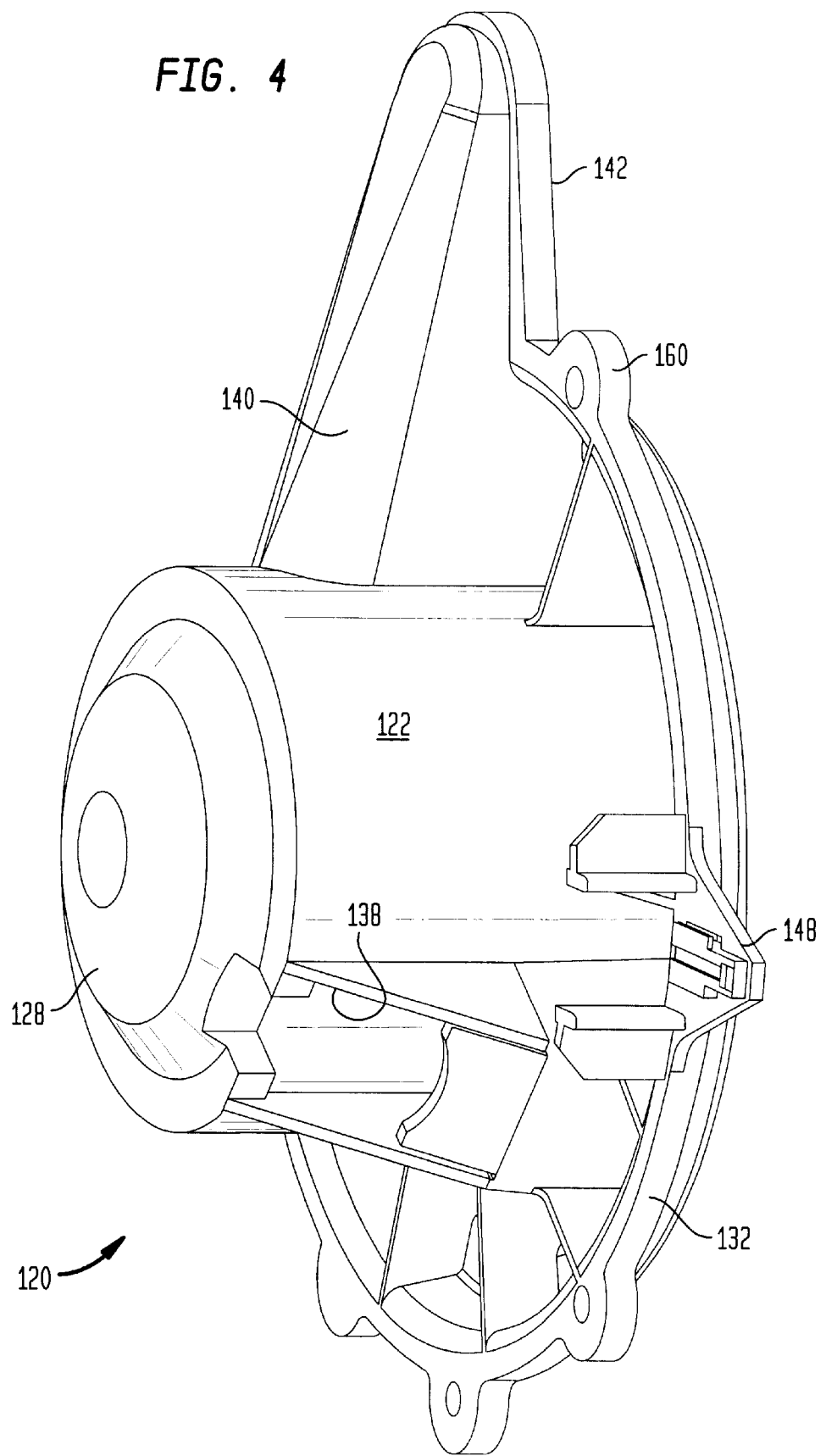
FIG. 4 is a perspective view of the cover structure of the invention.

The motor assembly 100 includes a one-piece cover structure, generally indicated at 120. The cover structure 120 is preferably molded from polypropylene 60% barium sulfate. As best shown in FIGS. 2 and 3, the cover structure 120 includes a generally cylindrical section 122 having an opening 124 at one end 126 thereof and a closed end 128 opposite end 126. An interior 130 is defined between the ends 126 and 128. A flange structure 132 extends from the cylindrical section 122 via ribs 134 to define a continuous annular wall. A first passage 136 is provided in open communication with atmosphere and in communication with the interior 130. The first passage 136 communicates with a connector opening 138 in the cover structure 120. The first passage 136 is sized to permit the connector 116 of the motor 112 to pass therethrough and the connector opening 138 is sized to receive the connector 116 in a tight-fit arrangement to substantially prevent air from passing between the connector 116 and the cover structure 120. The first passage 136 is defined in part by a tapered surface 137 which leads to the connector opening 138. With reference to FIG. 3, the connector 116 has a tapered surface 139 such that when the motor 112 is inserted into the cover structure 120, the tapered surface 139 of the connector 116 rides on the tapered surface 137 of the first passage 136 until the connector 116 enters the connector opening 138.

Figure 5:
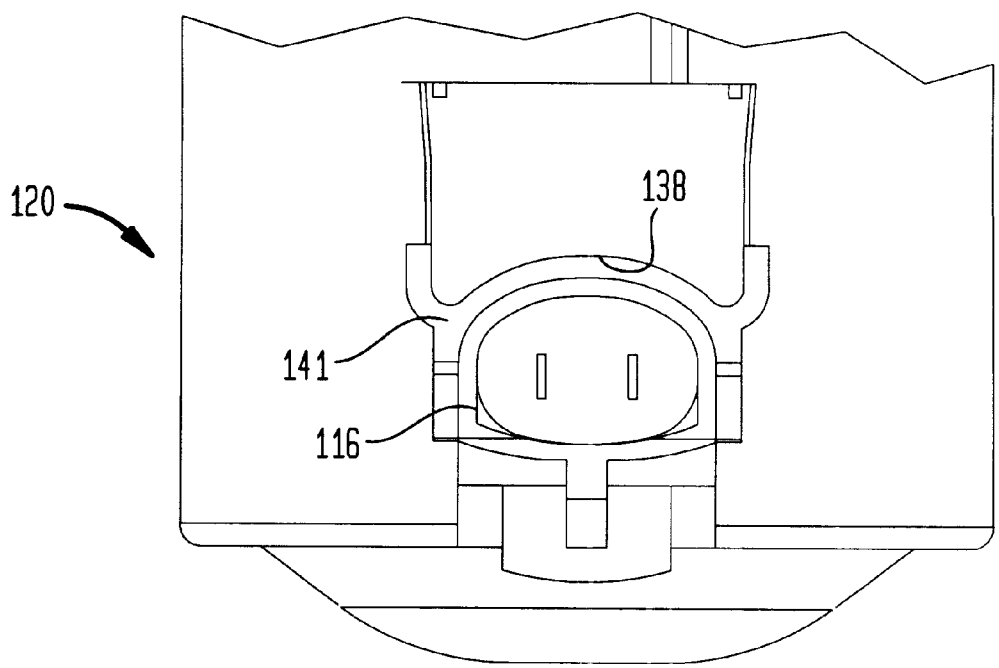
FIG. 5 is an end view of the motor connector and seal member of the invention.

With reference to FIG. 5, if desired, to further seal the connector 116 with respect to the cover structure 120, a separate seal member 141 can be provided around the opening 138 in the cover structure 120 between the cover structure and the connector 116. The seal and securing member 141 thus seals any air gap between the connector 116 and the cover structure 120 and seals the connector 116 in the cover structure.

The cover structure 120 also has an air tube 140 which defines a second passage 142. The second passage 142 is in open communication with the interior 130 and is in communication with the air flow passages 118 of the motor 112 so that air may enter the second passage 142 pass through the motor 112 and exit through the air flow passages 118 to cool the motor 112.

In accordance with the invention, and as shown in FIG. 3, a vibration damping member 144 is provided between the cylindrical portion 114 of the motor 112 and the inner surface 146 of the cylindrical section 122 of the cover structure 120. The vibration damping member 144 contacts the inner surface 146 of the cylindrical section 122 and the periphery of the cylindrical portion 114 of the motor 112 to dampen vibration of the motor. The vibration damping member 144 is an annular member composed of an thermoplastic elastomer, such as, for example, 35 shore A rubber. In the preferred embodiment, the vibration damping member 144 has an axial length of approximately 30 mm.

The cover structure 120 further comprises a clip structure 148 integral therewith and disposed near the flange structure 132. The clip structure 148 is constructed and arranged to provided support to an electrical wiring harness (not shown) associated with the motor.

With reference to FIG. 3, to mount the motor assembly 100 to a housing 150, the flange structure 132 includes a groove 152 therein constructed and arranged to receive a tongue 154 of the housing 150 to form a seal between the flange structure 132 and the housing 150. In addition, the flange 132 has apertures 156 for receiving guide pins 158 of the housing 150 to align the motor assembly 100 with the housing 150. The tongue and groove connection can be toleranced to aid in alignment of the motor assembly and housing. The motor assembly 100 can be further secured to the housing 150 by fasteners via mounting bosses 160 (FIG. 2).

To assemble the motor assembly 100, the vibration damping member 144 is placed on the cylindrical portion 114 of the motor 112. The interior 130 of the cover structure 120 is expanded by spreading the air tube 140 to increase the diameter of the bore 153 which defines the interior 130 of the cover structure 120. The motor 112 is aligned with the interior 130 and the connector 116 is aligned with the first passage 136. As the motor 112 is inserted into the cover structure 120, the tapered surface 139 of the connector 116 slides on the tapered surface 137 of the cover structure 120 until the connector is received in the opening 138. The motor 112 is fully seated upon contacting stops 162 defined in the cover structure 120 with the motor end 164 being covered by the cover structure 120. The motor 112 can be positively secured to the cover structure by fasteners.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A heating, ventilation and air conditioning assembly for mounting to a housing, the motor assembly comprising:
    a motor having a generally cylindrical portion and a connector extending from said cylindrical portion, said motor having an air flow passage therethrough,
    a one-piece cover structure comprising:
        a generally cylindrical section having an opening at one end thereof and a closed end opposite said one end, and an interior between said ends, said motor being disposed in said interior so that one end of said motor is covered by said closed end,
        a flange structure extending from said cylindrical section,
    a first passage having an open end and being in communication with said interior, said first passage communicating with a connector opening in said cover structure, said first passage being sized to permit said connector of said motor to pass therethrough and said connector opening receiving said connector, said connector opening being sized to fit tightly with said connector to substantially prevent air from passing between said connector and said cover structure, and
    a second passage in open communication with said interior and in communication with said air flow passage of said motor so that air may enter said second passage and exit through said air flow passage to cool said motor, and
    a vibration damping member between said cylindrical portion of said motor and said cylindrical section of said cover structure so as to contact said cylindrical portion and said cylindrical section to dampen vibration of said motor,
    wherein said first passage is defined in part by a tapered surface which leads to said connector opening and said connector has a tapered surface such that when said motor is inserted into said cover structure, said tapered surface of said connector rides on said tapered surface of said first passage until said connector enters said connector opening.

2. The motor assembly according to claim 1, wherein said cover structure further comprises an integral clip structure associated with said flange structure, said clip structure being constructed and arranged to provided support to an electrical wiring harness associated with the motor.

3. The motor assembly according to claim 1, wherein said vibration damping member is an annular member composed of an thermoplastic elastomer.

4. The motor assembly according to claim 3, wherein said elastomer is 35 shore A rubber.

5. The motor assembly according to claim 1, wherein said elastomer has a length of approximately 30 mm.

6. The motor assembly according to claim 1, wherein said cover structure is molded from polypropylene 60% barium sulfate.

7. The motor assembly according to claim 1, wherein said flange structure is annular and includes a groove therein constructed and arranged to receive a tongue of the housing to form a seal between the flange structure and the housing.

8. The motor assembly according to claim 1, wherein said cover structure includes at least one stop surface which engages said one end of said motor.

9. The motor assembly according to claim 1, further comprising a seal member providing a seal between said connector and said cover structure and which secures said connector to said cover structure.

10. A heating, ventilation and air conditioning motor and housing assembly comprising:

a housing having a tongue portion for engaging a groove, a motor having a generally cylindrical portion and a connector extending from said cylindrical portion, said motor having an air flow passage therethrough, a one-piece cover structure comprising:

a generally cylindrical section having an opening at one end thereof and a closed end opposite said one end, and an interior between said ends, said motor being disposed in said interior so that one end of said motor is covered by said closed end, an annular flange structure extending from said cylindrical section, said flange structure including a groove therein receiving a tongue of the housing to form a seal between the flange structure and the housing, a first passage having an open end and being in communication with said interior, said first passage communicating with a connector opening in said cover structure, said first passage being sized to permit said connector of said motor to pass therethrough and said connector opening receiving said connector, said connector opening being sized to fit tightly with said connector to substantially prevent air from passing between said connector and said cover structure, and a second passage in open communication with said interior and in communication with said air flow passages in said motor so that air may enter one said second passage and exit through said air flow passage to cool said motor, and a vibration damping member between said cylindrical portion of said motor and said cylindrical section of said cover structure so as to contact said cylindrical portion and said cylindrical section to dampen vibration of said motor, wherein said first passage is defined in Part by a tapered surface which leads to said connector opening and said connector has a tapered surface such that when said motor is inserted into said cover structure, said tapered surface of said connector rides on said tapered surface of said first passage until said connector enters said connector opening.

11. The motor and housing assembly according to claim 10, wherein said housing includes at least one guide pin which is received in an aperture in said flange structure.

12. The motor and housing assembly according to claim 10, wherein said cover structure further comprises a clip structure associated with said flange structure and constructed and arranged to provided support to a wiring harness for powering the motor.

13. The motor and housing assembly according to claim 10, wherein said vibration damping member is an annular member composed of an thermoplastic elastomer.

14. The motor and housing assembly according to claim 13, wherein said elastomer is 35 shore A rubber.

15. The motor and housing assembly according to claim 10, wherein said elastomer has a length of approximately 30 mm.

16. The motor and housing assembly according to claim 10, wherein said cover structure is molded from polypropylene 60% barium sulfate.

17. The motor and housing assembly according to claim 10, wherein said flange structure includes a groove therein receiving said tongue of the housing to form a seal between the flange structure and the housing.

18. The motor and housing assembly according to claim 10, wherein said cover structure includes at least one stop surface which engages said one end of said motor.

19. The motor and housing assembly according to claim 10, further comprising a seal member providing a seal between said connector and said cover structure and which secures said connector to said cover structure.

20. A method of assembling an heating, ventilation and air conditioning motor to a housing, the housing having a tongue portion, the method including:

providing a motor having a generally cylindrical portion and an electrical connector extending from said cylindrical portion, providing a cover structure having a generally cylindrical section having an opening at one end thereof and a closed end opposite said one end, and an interior between said ends, a flange structure extending from said cylindrical section, said flange structure including a groove therein, said cover structure having a passage having an open end and being in communication with said interior, said passage communicating with a connector opening in said cover structure, said passage being sized to permit said connector of said motor to pass therethrough, providing a vibration damping member about at least a portion of said cylindrical portion of said motor, inserting said motor into said interior with said connector of said motor being received in said passage, moving said motor further into said interior until said connector enters said connector opening, said passage being defined in part by a tapered surface which leads to said connector opening and said connector has a tapered surface such that when said motor is moved further into said interior, said tapered surface of said connector rides on said tapered surface of said passage until said connector enters said connector opening in a snap-fit arrangement, and inserting said tongue of said housing into said groove of said flange structure to provide a seal between said housing and flange structure.

* * * * *